US005402325A

United States Patent [19]

Wisler et al.

[11] Patent Number: 5,402,325

[45] Date of Patent: Mar. 28, 1995

[54] VEHICLE HEADLAMP ASSEMBLY

[75] Inventors: Jan A. Wisler; Chad E. Spencer, both of Anderson; David R. McMahan, Noblesville; William E. Nagengast, Anderson, all of Ind.

[73] Assignee: General Motors Corporation, Detroit, Mich.

[21] Appl. No.: 174,538

[22] Filed: Dec. 28, 1993

[51] Int. Cl.$^{6}$ .......................... B60Q 1/00; F21V 1/00

[52] U.S. Cl. ...................................... 362/61; 362/306; 362/351

[58] Field of Search .................. 362/61, 306, 351, 457

[56] References Cited

U.S. PATENT DOCUMENTS

| | | | |
|---|---|---|---|
| 4,794,500 | 12/1988 | Bradley | 362/226 |
| 4,819,133 | 4/1989 | Kochi et al. | 362/61 |
| 4,829,408 | 5/1989 | Haydu | 362/61 |
| 4,841,419 | 6/1989 | Ohishi | 362/226 |
| 4,882,660 | 11/1989 | Liverance et al. | 362/226 |
| 4,893,218 | 1/1990 | Dilk et al. | 362/61 |
| 4,926,301 | 5/1990 | Liverance et al. | 362/226 |
| 4,947,294 | 8/1990 | Van Duyn et al. | 362/61 |
| 4,972,301 | 11/1990 | Kasboske | 362/61 |
| 5,003,436 | 3/1991 | Yamada et al. | 362/61 |
| 5,055,980 | 10/1991 | Mochizuki | 362/61 |
| 5,146,392 | 9/1992 | Kasboske | 362/61 |
| 5,180,219 | 1/1993 | Geddie | 362/61 |
| 5,195,815 | 3/1993 | Watanabe et al. | 362/61 |
| 5,205,633 | 4/1993 | Kasboske | 362/61 |

FOREIGN PATENT DOCUMENTS

| | | | |
|---|---|---|---|
| 4-092302 | 3/1992 | Japan | 362/61 |

*Primary Examiner*—Ira S. Lazarus
*Assistant Examiner*—Sara Sachie Raab
*Attorney, Agent, or Firm*—Ernest E. Helms

[57] ABSTRACT

A vehicle headlamp assembly is provided including a reflector housing having a forward face and a rearward face intersected by a bore, the rearward face having a generally annular flat with a series of depressions; a bulb providing a source of illumination positioned generally adjacent the reflector housing forward face; a bulb housing providing an electrical connection for the bulb and for mounting the bulb, the bulb housing having a first portion inserted within the housing bore and a second portion positioned generally adjacent to the reflector housing rear face annular flat contacting the same; a generally annular retainer having a first portion extending through the reflector housing bore and a second portion contacting the rear face of the reflector housing within the depressions of the rear face, the retainer also having an interlocking flange spaced from the second portion with biasing tabs for retaining the bulb housing within the reflector housing bore and urging the bulb housing against the reflector housing rear face; a shield for blocking a portion of the illumination generated by the bulb, the shield having a main body portion connected with legs which are in turn connected with an annular ring, the annular ring contacting a forward face of the reflector housing; and a connecting subarrangement connecting the first portion of the retainer with the shield annular ring, thereby affixing the retainer and the shield to the reflector housing.

13 Claims, 4 Drawing Sheets

VEHICLE HEADLAMP ASSEMBLY

FIELD OF THE INVENTION

This invention concerns headlamps in general, especially vehicle headlamp assemblies, and more particularly relates to a vehicle headlamp provided with a bulb retaining arrangement for replaceable bulbs mounted in the vehicle headlamp reflector that is press fitted through a bulb shield mounted within the reflector.

BACKGROUND OF THE INVENTION

Current U.S. Government regulations require vehicle headlamps that permit the use of replaceable bulbs to have bulb retainers capable of accepting and retaining such bulbs. In order to comply with these regulations, it is also common for vehicle manufacturers to use a bulb shield to reduce the light emitted from these bulbs so as to reduce headlamp glare (uncontrolled light) to thereby meet U.S. Government specifications regarding light output from the headlamp assembly. Examples of headlamp assemblies using the above arrangements may be found by a review of Liverance et al U.S. Pat Nos. 4,926,301 and 4,882,606, commonly assigned.

In some cases, it is preferred to preassemble the bulb retainer and bulb shield together, and at a later time assemble this subassembly to the headlamp reflector by inserting the shield from the rear of the reflector, through an opening (or central bore) of the reflector. This concept of preassembling the shield to the retainer for later assembly through the central bore in the housing from the rear of the reflector has implications on vehicle headlamp design and performance. One area affected is that of the central bore. With this concept, the size of the central bore restricts the size of the bulb shield to a size smaller than the central bore of the reflector housing. Regarding the central bore size, if it is too large in size, this can create problems, some of which are bulb positioning (loss of light output from bulb mispositioning), loss of reflector surface (loss of light output), opportunities for dirt entry, and other factors. If the central bore is too small, there can be a restriction in bulb shield size. Restriction of the bulb shield size can adversely affect a number of vehicle headlamp areas including shield tolerances and effectiveness, temperature buildup around the bulb, bulb life, mounting of ornamental or decorative caps to the shield, light output, headlamp quality rating, and other factors. Also, in most headlamp assemblies which use a shield and a bulb retaining device, the shield and/or bulb retainer must be affixed to the headlamp reflector with one or more fasteners.

SUMMARY OF THE INVENTION

The present invention describes a headlamp assembly providing an alternative to the aforementioned patents which additionally allows the shield and bulb housing retainer (hereinafter referred to as the retainer) to be affixed to the reflector housing without the utilization of fasteners and additionally allows the use of a bulb shield which is larger than the central bore of the reflector housing without utilizing any fasteners to affix the shield to the reflector housing.

A greater appreciation of the advantages of the present invention will be apparent after a review of the accompanying drawings and detailed description.

DESCRIPTION OF THE PREFERRED EMBODIMENT

Figure 1:
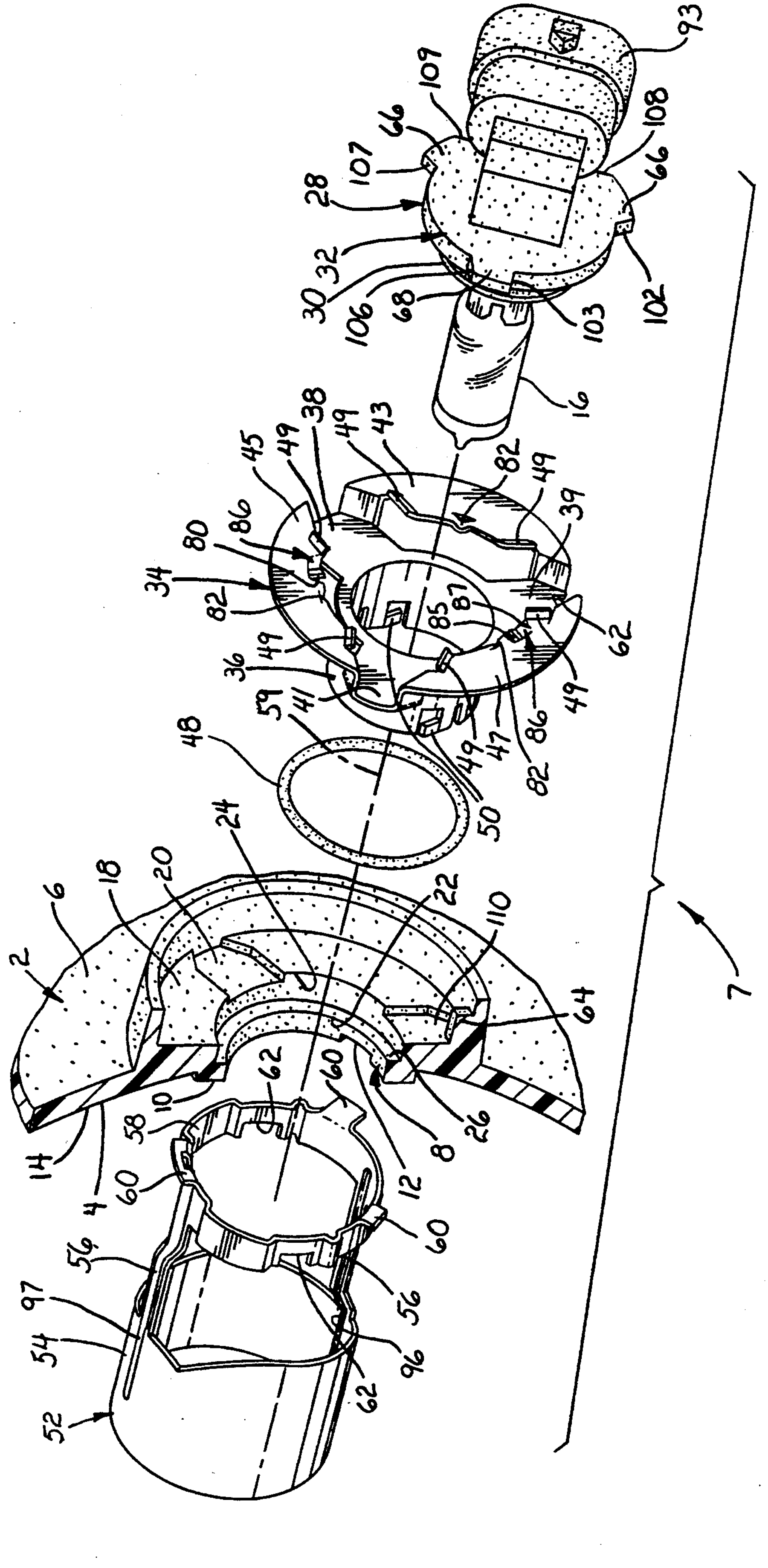
FIG. 1 is an exploded view of a preferred embodiment of the present invention.
Figure 3:
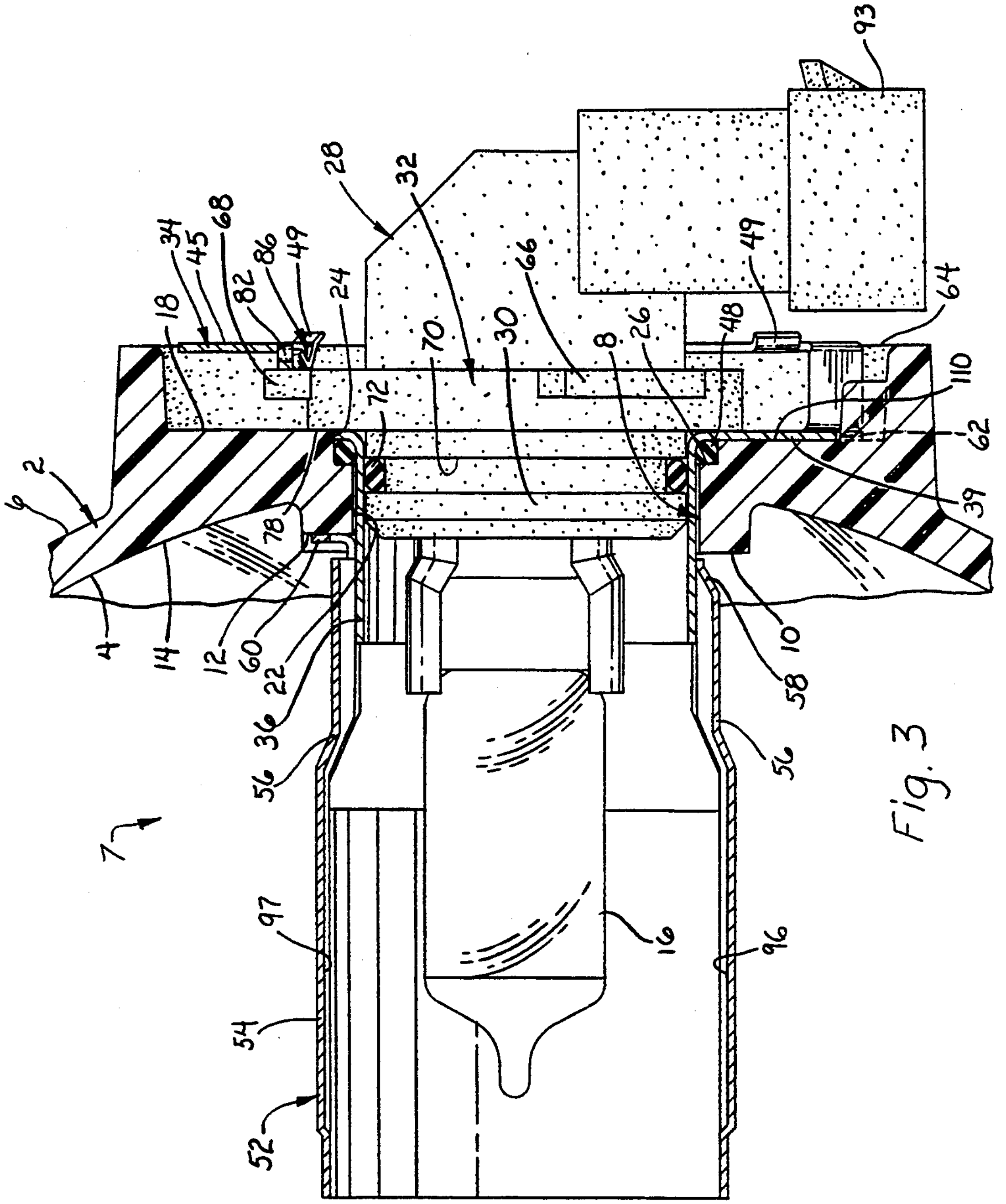
FIG. 3 is a view taken along line 3—3 of FIG. 2.
Figure 7:
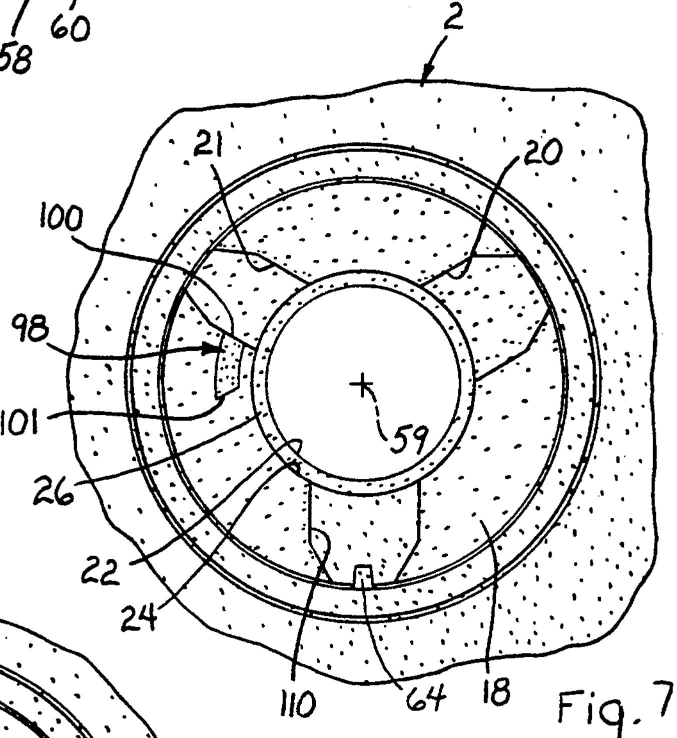
FIG. 7 is a partial rear plane elevational view of the reflector housing shown in FIG. 1.

Referring to FIGS. 1 and 3, a preferred embodiment replaceable bulb vehicle headlamp assembly 7 according to the present invention is provided. The headlamp assembly 7 has a reflector housing 2 with a forward face 4 and a rearward face 6. Intersecting the forward face 4 and the rearward face 6 is an intersecting central bore 8. The reflector housing may have a far forward end (not shown) and attached lens, or the reflector housing may pivot within a housing having a fixed lens along its forward interface. The reflector housing is typically made of a moldable polymeric material such as a mineral-filled thermoset polyester or various thermoplastic materials that may have filler materials added for improved performance in these kinds of applications. The forward face 4 of the reflector housing has an annular flat 10 with optional angularly spaced depressions 12. Additionally, the forward face 4 has a parabolic reflector surface portion 14 which is used as a reflector surface for reflecting the illumination generated by a generally adjacently positioned bulb 16, the filament of which is positioned at the focal point of the parabolic surface 14. The rearward face 6 of the reflector housing 2 has a circular flat 18 with three angularly spaced depressions 20, 21, 110 (see FIG. 7). The bore 8 has a small diameter section 22 separated from a larger diameter section 24 by an annular shoulder 26.

To mount the bulb 16 and to provide for electrical connections, there is provided a bulb housing 28. The bulb housing has a first portion 30 for mounting the bulb 16 in the bore 8 and a second portion 32 which seats directly on the circular flat 18 of rear face 6 of the reflector housing in a manner to be described later. Additionally, the bulb housing 28 has a connector end 93 for receipt of the electrical connections which power the bulb 16.

The bulb housing 28 is held in position by a retainer 34. The retainer 34 can be fabricated from a single piece stamping. The retainer 34 has a tubular or annular first portion 36 which projects into the bore 8. Joined to the retainer first portion 36 is a second portion comprised of yokes 38, 39 and 41. The yokes 38, 39 and 41 have spaced therefrom three angularly spaced between flanges 43, 45 and 47. Each flange 43, 45 and 47 has a spring contact closed tab 82. The retainer 34 is fabricated from a 201 annealed stainless steel sheet approximately 0.51 millimeters thick.

The first portion 36 of the retainer on its extreme end has a flag or tab member 50 which can be bent outwardly.

The next member of the housing assembly 7 is a shield 52. The shield 52 has a diameter typically larger than the small diameter 22 of the bore 8. Typically, the shield 52 will be fabricated from a 301 stainless sheet metal stamping which has been rolled and welded. The main body 54 of the shield is connected by two legs 56 with an annular ring 58. The annular ring 58 has angularly spaced, radially extending feet 60. The annular ring 58 also has optional cut-out sections 62 corresponding in equal number to the tabs 50 provided on the retainer 34. In another embodiment not shown, the annular ring has a generally constant axial dimension without the cut-out sections 62.

An O-ring 48 is first placed around the first portion 36 of the retainer 34, which is then inserted within the bore 8, trapping the O-ring 48 so that it rests within the large diameter portion 24 of the reflector housing 2 and between the shoulder 26 and the yokes 38, 39 and 41. The O-ring 48 is made from an elastomeric polymeric material impregnated with a silicone lubricant. The O-ring 48 not only functions to seal the bore 8 along the periphery of the retainer first section 36 but also acts to concentrically center the first portion 36 of the retainer within the bore 8.

The depression 110 of the rear reflector face 6 has a small in-molded locator rib 64 which mates with a cut out 62 of the retainer to ensure the proper angular orientation of the retainer 34 with respect to the reflector housing 2.

Figure 2:
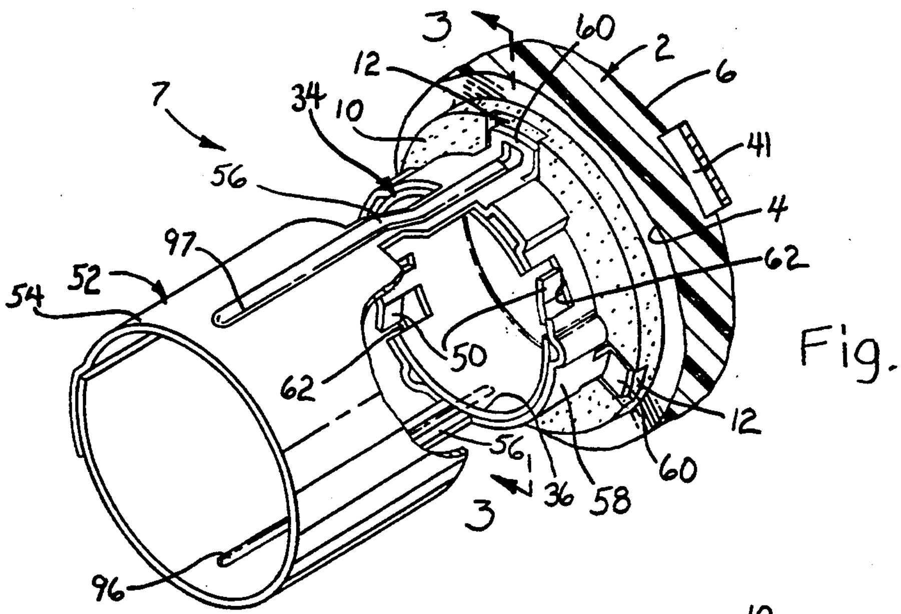
FIG. 2 is a partial perspective view of a preferred embodiment of the present invention shown from the front of the reflector housing.

Referring additionally to FIG. 2, the bulb shield 52 is mated with the reflector housing 2 such that its feet 60 are placed within the front face depressions 12 (or annular flat 10 if optional depressions 12 are not utilized). This will then place the tabs 50 of the retainer into radial alignment with the windows 62 of the annular ring 58. A fixture (not shown) will come inside the main body 54 of the bulb shield and then extend the tabs 50 radially outward, causing an interference fit of approximately 0.3 millimeters (along the axis 59 of the bulb assembly), causing the bulb shield 52 and the retainer 34 to be affixed to one another and to the reflector housing 2. In an embodiment not shown wherein the depressions 12 and cut-out 62 are not utilized, an assembly mandril-like fixture (also not shown) will come inside the main body 54 of the bulb shield and align with grooves 97, 96 to properly position the shield 52 relative to the retainer 34. The grooves 97, 96 are both indexing features for proper bulb shield 52 orientation and strengthening features in the legs of the shield to ensure the shield remains in the proper position regardless of vehicle vibration during the vehicle operation. This mandril-like assembly fixture, after entering the main body 54 of the bulb shield 52, then extends the tabs 50 radially outward.

The bulb 16 and the bulb housing 28 will then be fitted within the retainer 34 to complete the assembly. The bulb 16 is first installed in the bulb housing 28. The bulb housing also has a groove 70 and an enclosed O-ring 72 which is a polymeric O-ring impregnated with a silicon lubricant which seals the interior of the retainer first portion 36.

The bulb housing 28 has two large ears 66 and a smaller ear 68 and in the embodiment illustrated is rotated in a clockwise direction to achieve assembly. Ears 66 are both arcuately too large to be inserted within the yoke 41, and this ensures proper orientation as shown of the bulb housing 28 in the insertion process. The above insertion orientation places the ear 68 at approximately the ten o'clock position in radial alignment with the yoke 41 (FIG. 1).

Lead-ins 49 ensure that the ears 68, 66 go under the flanges 45, 43 and 47 as the bulb housing 28 is pushed slightly inwardly (toward the retainer 34) and turned clockwise. A stud 98 (FIG. 7) projects rearwardly from the housing rear face 18 at approximately the 9:30 position. This stud 98 has two key surfaces. Stud surface 100 contacts ear 68 at surface 103 to prevent the bulb housing 28 from being turned initially counterclockwise (at bulb insertion). This same stud 98 has surface 101 that acts as a stop for the ear 66 at surface 102 that stops the bulb rotation and creates the correct bulb housing 28 positioning in the reflector 2.

Figure 8:
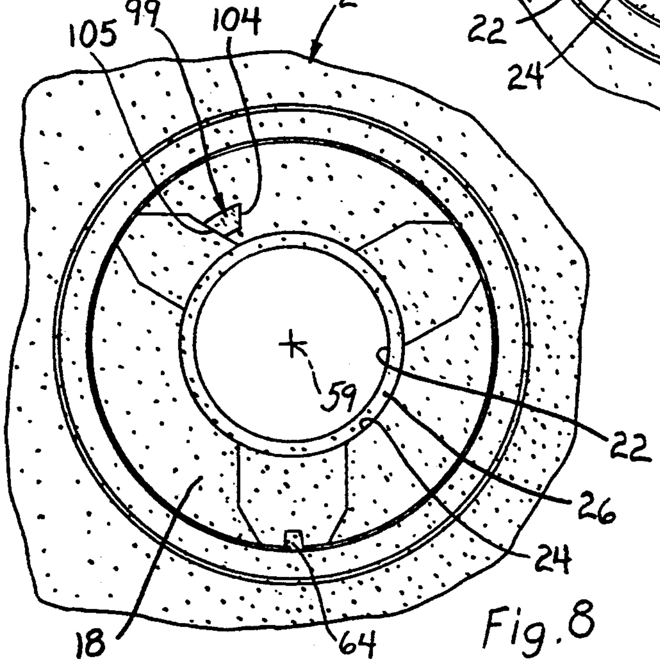
FIG. 8 is a view similar to FIG. 7 for an embodiment wherein the bulb housing is rotated counterclockwise for assembly, instead of clockwise.

A stud 99 (FIG. 8) can be located in a different position on the housing rear face 18 to permit counterclockwise bulb rotation for bulb insertion, should this be required for bulb clearance to other structural or engine compartment components during initial bulb installation during headlamp manufacture or during bulb servicing. The stud 99 has two surfaces 104, 105 that act in a similar but opposite manner to stud 98 with surfaces 101, 100. Stud 99 is the preferred embodiment for counterclockwise insertion of the bulb housing 28, should that be required by the headlamp design. With stud 99, the surface 105 contacts ear surface 106 to prevent clockwise rotation of the bulb housing. As the bulb housing is rotated counterclockwise, ear surface 107 contacts stud surface 104 to stop the bulb rotation and thereby correctly position the bulb housing 28 in the reflector 2. The retainer 34 can thus be capable of accepting bulbs that are inserted clockwise or counterclockwise without any change in the design of the retainer 34 by changing the reflector rear face 6 to have the configuration shown in FIG. 7 (with stud 98) or to have the configuration shown in FIG. 8 (with stud 99).

A forward face 78 (FIG. 3) of the bulb housing 28 is mated directly with the flat 18 of the reflector housing rear face 6 and is rotated until the ear 66 is prevented (as mentioned previously) from further rotation by contact of bulb ear surface 102 with stud surface 101. The end series of closed tabs 82 act as contact points and cause the retainer flanges 47, 45 and 43 to act as a spring to ensure the contact of the bulb housing forward face 78 against the flat 18 of the housing rear face. The lower open tab 86 acts as an anti-rotation feature to prevent the bulb housing 28 from vibrating (as a result of vehicle vibration) and thereby rotating back out of the retainer 34 and also prevents inadvertent removal of the bulb housing 28 from the retainer 34 after its assembly by counterclockwise rotation by contact with the open tab end 85 with a surface 108 of the ear 66 (lower ear 66 as shown in FIG. 1 ). Clockwise rotation of lower ear 66 from a position angularly aligned with yoke 39 to an angular position clockwise of open end 85 of tab 86 is allowed by the ear 66 camming up a closed end 87 of the tab 86. For prevention of bulb back-out and to serve as an anti-rotation feature for counterclockwise insertion bulbs, end 80 (of open tab 86 adjacent to the yoke 38) serves in a similar fashion as end 85. End 80 contacts ear 66 at surface 109 to prevent bulb housing 28 from clockwise rotation due to vehicle-induced vibration and bulb back-out.

To remove the bulb housing 28, the bulb housing 28 must be rotated counterclockwise.

Figure 4:
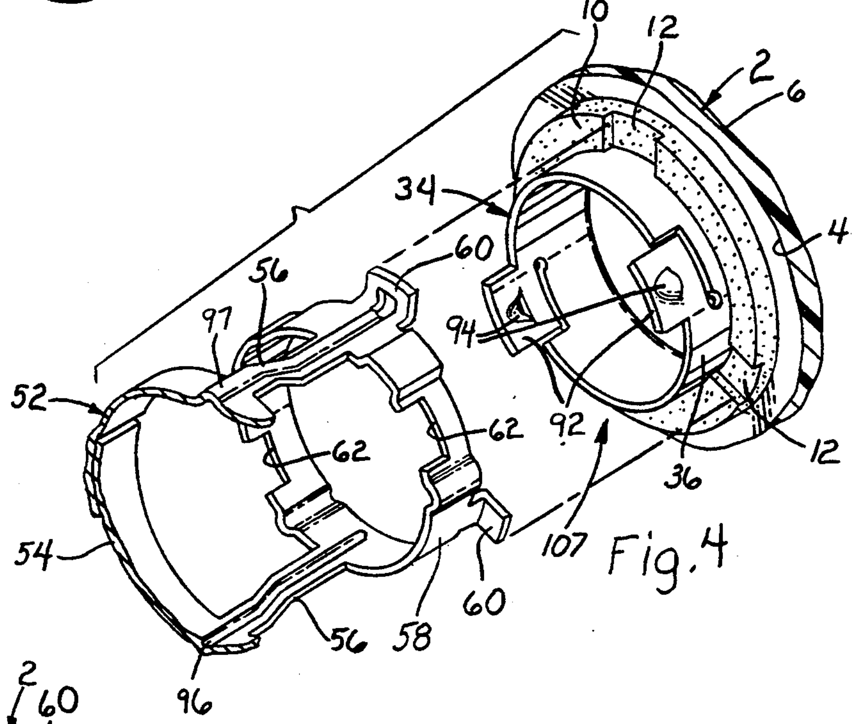
FIG. 4 is an exploded view of an alternative preferred embodiment to that shown in FIG. 3.
Figure 5:
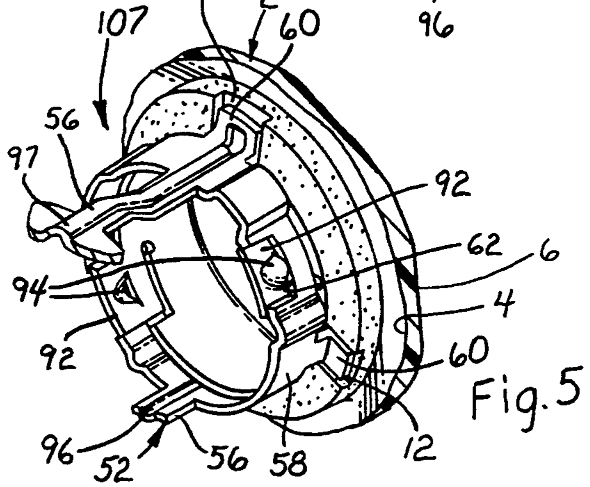
FIG. 5 is a partial connected view showing the embodiment of FIG. 4 in an affixed position.

Referring additionally to FIGS. 4 and 5, an alternative preferred embodiment 107 of the present invention is illustrated with like items given identical reference numerals. In the alternative provision, a snap-fit connection between the retainer first portion 36 and the shield 52 is illustrated. In the snap-fit alternative, the flag 92 of the retainer has a snap-in depression 94, and connection of the bulb shield 52 to the retainer 34 is achieved by simply axially pushing the bulb shield over the flag 92 as shown in FIG. 5. The amount of interference is typically less than that with the bent-out tag-type flag and is in the neighborhood of 0.25 millimeters.

Figure 6:
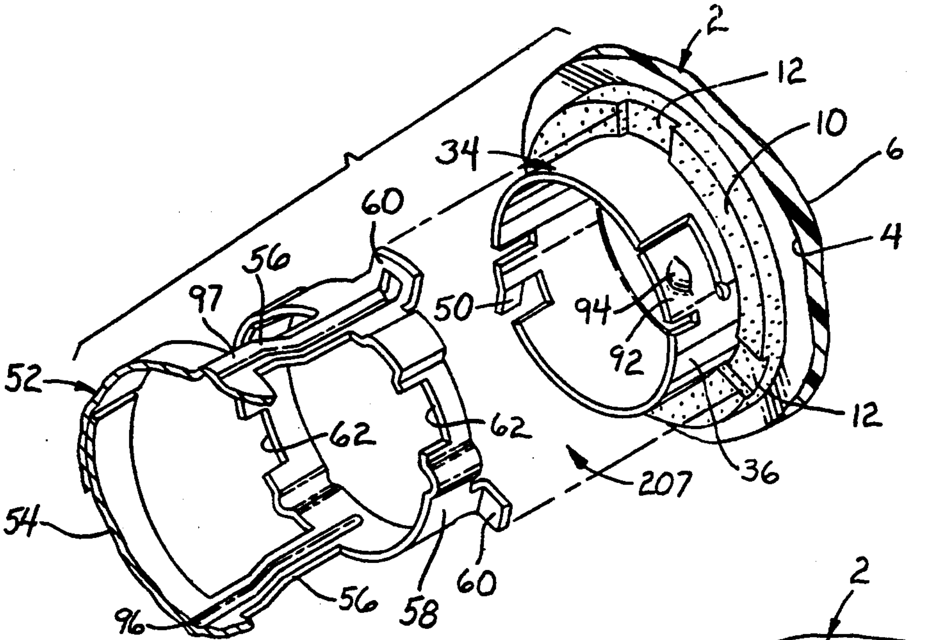
FIG. 6 is a third alternative view of a portion of a retainer combining the elements of the retainer shown in FIGS. 3 and 4.

Referring additionally to FIG. 6, a third embodiment 207 is illustrated which utilizes a first portion 36 retainer and both the pop-type and the bent-out tab. The shield and the remaining elements for this embodiment are the same as previously explained.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. A vehicle lamp assembly comprising:

a reflector housing having a forward face and a rearward face intersected by a bore;

a bulb providing a source of illumination positioned generally adjacent the reflector housing forward face;

a bulb housing providing an electrical connection for the bulb and for mounting the bulb, the bulb housing having a first portion inserted within the housing bore and a second portion positioned generally adjacent to the reflector housing rear face;

a generally annular retainer having a first portion extending through the reflector housing bore and a second portion contacting the rearward face of the reflector housing, the retainer also including interlocking means for retaining the bulb housing within the reflector housing bore;

a shield for blocking a portion of the illumination generated by the bulb, the shield having a portion contacting the forward face of the reflector housing; and means connecting the first portion of the retainer with the shield, thereby affixing both to the reflector housing.

2. A vehicle lamp assembly as described in claim 1 wherein the lamp assembly is for a headlamp of a vehicle.

3. A vehicle lamp assembly as described in claim 1 wherein the shield has a lower annular ring and the retainer first portion has a snap-fit connection with the shield lower annular ring.

4. A vehicle lamp assembly as described in claim 1 wherein the shield has a lower annular ring and the retainer first portion has a tab which is bent to interlock the shield with the retainer.

5. A vehicle lamp assembly as described in claim 1 wherein the reflector housing rear face has cut out depressions and wherein the retainer second portion fits within the depressions and wherein the bulb housing second portion directly contacts the rear face of the reflector housing.

6. A vehicle lamp assembly as described in claim 1 wherein the retainer on an outer periphery of the retainer has a seal which radially centers the retainer within the reflector housing bore.

7. A vehicle lamp assembly as described in claim 1 wherein the bulb housing has a seal centering the bulb housing within the retainer.

8. A vehicle lamp assembly as described in claim 1 wherein the retainer interlocking means is a flange rearwardly spaced away from the retainer second portion with spring means to urge the bulb housing toward the rear face of the reflector housing.

9. A vehicle lamp assembly as described in claim 1 wherein the means for connecting the first portion of the retainer to the shield includes the shield having a lower annular ring and the retainer first portion having a snap-fit and a bent tab connection with the same.

10. A vehicle headlamp assembly as described in claim 1 wherein the bulb housing can only be assembled into the retainer by rotation in a first direction, and rotation in a second direction is prevented by a stud projecting from the rear face.

11. A vehicle headlamp assembly comprising:

a reflector housing having a forward face and a rearward face intersected by a bore, the rearward face having a generally annular flat with a series of depressions;

a bulb providing a source of illumination positioned generally adjacent the reflector housing forward face;

a bulb housing providing an electrical connection for the bulb and for mounting the bulb, the bulb housing having a first portion inserted within the housing bore and a second portion positioned generally adjacent to the reflector housing rear face annular flat contacting the same;

a generally annular retainer having a first portion extending through the reflector housing bore and a second portion contacting the rear face of the reflector housing within the depressions of the rear face, the retainer also having an interlocking flange rearwardly spaced from the second portion with biasing tabs for retaining the bulb housing within the reflector housing bore and urging the bulb housing against the reflector housing rear face;

a shield for blocking a portion of the illumination generated by the bulb, the shield having a main body portion connected with legs which are in turn connected with an annular ring, the annular ring contacting a forward face of the reflector housing; and means connecting the first portion of the retainer with the shield annular ring, thereby affixing the retainer and the shield to the reflector housing.

12. A lamp assembly as described in claim 11 wherein the retainer has a bent tab to interlock with the annular ring of the shield.

13. A vehicle headlamp assembly as described in claim 11 wherein the means connecting the first portion of the retainer to the shield includes a snap-fit connection between the retainer first portion and the shield annular ring.

* * * * *